Figure 1:
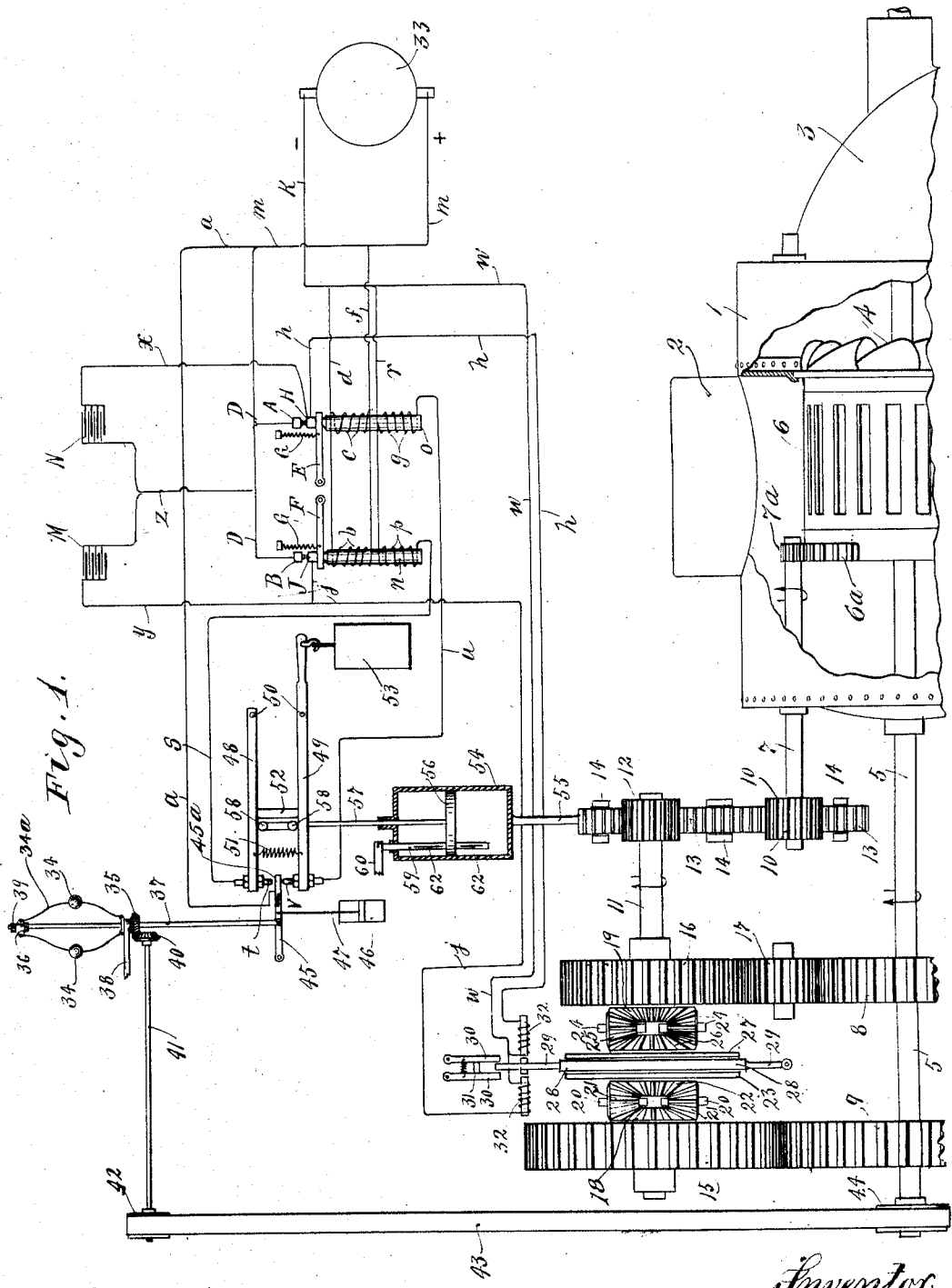

No. 887,223. PATENTED MAY 12, 1908.
J. PEARSON.
WATER WHEEL GOVERNOR.
APPLICATION FILED DEC. 21, 1906.

2 SHEETS—SHEET 1.

Witnesses.
A. H. Opsahl.
H. S. Kilgore.

Inventor.
John Pearson.
By his Attorneys.
Williamson & Merchant.

No. 887,223. PATENTED MAY 12, 1908.
J. PEARSON.
WATER WHEEL GOVERNOR.
APPLICATION FILED DEC. 21, 1906.

2 SHEETS—SHEET 2.

Witnesses.
A. H. Opsahl.
H. D. Kilgore.

Inventor.
John Pearson.
By his Attorneys.
Williamson & Merchant

UNITED STATES PATENT OFFICE.

JOHN PEARSON, OF SOMERSET, WISCONSIN, ASSIGNOR OF ONE-THIRD TO JAMES F. WILLIAMSON AND ONE-SIXTH TO FRANK D. MERCHANT, OF MINNEAPOLIS, MINNESOTA.

WATER-WHEEL GOVERNOR.

No. 887,223.     Specification of Letters Patent.     Patented May 12, 1908.

Application filed December 21, 1906. Serial No. 348,875.

*To all whom it may concern:*

Be it known that I, JOHN PEARSON, a citizen of the United States, residing at Somerset, in the county of St. Croix and State of Wisconsin, have invented certain new and useful Improvements in Water-Wheel Governors; and I do hereby declare the following to be a full, clear, and exact description of the invention, such as will enable others skilled in the art to which it appertains to make and use the same.

This invention relates, broadly, to speed controlling mechanism for motors, the term "motors" being used in a broad sense, to include generally such power producing mechanism as water wheels, steam engines, explosive engines, dynamos, etc.

The invention has been particularly designed to meet the requirements of efficient speed regulation of water wheels. Many of the advantages derived from the application of my improved speed controller to water wheels, also result from the application thereof to other motors, but for the purposes of clearness and definiteness, the following comments and illustrations are made in respect to the use of the improved governor in connection with a water wheel.

With a given head of water, a predetermined desired speed of a water wheel, under changing working loads, is maintained by a regulation of the water supplied to the wheel; and for this purpose an adjustable gate or inlet valve (which constitutes the speed controlling element of the water motor) is commonly provided. To render the power of the water wheel available to move the water wheel gate it has also been customary to employ a reversible so-called "differential" or "dynamometer gearing", which gearing usually involves a clutch or friction device by which the gearing is thrown into and out of action, directly or indirectly, by water wheel driven centrifugal balls or weights. A clutch or friction device in such arrangement requires considerable power to operate it and, hence, centrifugal balls or weights of very considerable size have necessarily been provided.

Heavy centrifugal balls or weights do not respond quickly to changes in speed, and for this reason the governors or speed controllers hitherto provided for the regulation of water wheels have not met the requirements of the service. To illustrate, with a speed controlling mechanism employing heavy balls or weights, if the working load be suddenly and materially reduced, these heavy balls or weights will not respond quickly and the opening movement of the gate will not be started as quickly as it should, and consequently there will be material reduction in the speed of the water wheel. Again, if the working load be suddenly and materially increased, the heavy centrifugal balls or weights will be too slow in their movement, and consequently the opening movement of the gate will be delayed too long, with the obvious result that in this instance also the speed of the water wheel will be materially reduced.

In accordance with my invention, I employ an electrical relay for regulating the movements of the speed controlling element of the water wheel or other motor, and in connection therewith employ a so-called "relay actuator" that is subject to changes in the speed of the motor. This arrangement makes it possible and highly practicable to use, as a relay actuator, very small and light centrifugal balls or weights, running at very high speed. In fact, a very small and very sensitive "tachometer" such as that known to the trade as the Shaeffer and Budenberg tachometer, which is extremely sensitive to speed changes can be advantageously employed. With this electrical relay, the current used in the primary circuit thereof may be extremely small, in fact, so small that sparks produced between the primary contacts are scarcely perceptible to the naked eye, while the current used in the secondary circuit of the relay may be relatively very strong, so that so-called "secondary magnets" therein will be sufficiently powerful to throw into action the gearing or other mechanism used to adjust the speed controlling element of the motor. I also provide an improved device which I term an "anti-racing device" which is operative under initial movements of the gearing, or mechanism for adjusting the speed controlling element of the motor, to break the controlling circuit of the electrical relay, and thus prevent excessive movements of the power controlling element of the motor and the consequent "racing" of the motor.

In applying my improved speed controlling mechanism to a water wheel, I preferably employ a reversible differential gearing, for rendering the power of the water wheel available to adjust the power controlling element, to-wit, the "gate" thereof. This differential gearing also preferably includes or is thrown into and out of action by a friction brake, which friction brake is arranged to be actuated by the relatively powerful "secondary magnets" of the relay. The very small and sensitive centrifugal balls or weights which control the primary contacts of the electrical relay, are driven from the water wheel and, consequently, are of course subject to changes in speed thereof.

In the accompanying drawings which illustrate the invention applied to a water wheel, like characters indicate like parts throughout the several views.

Figure 2:
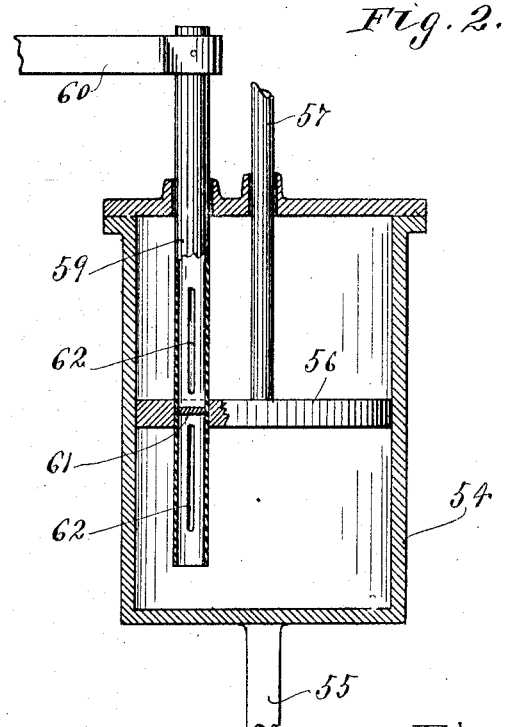
Figure 3:
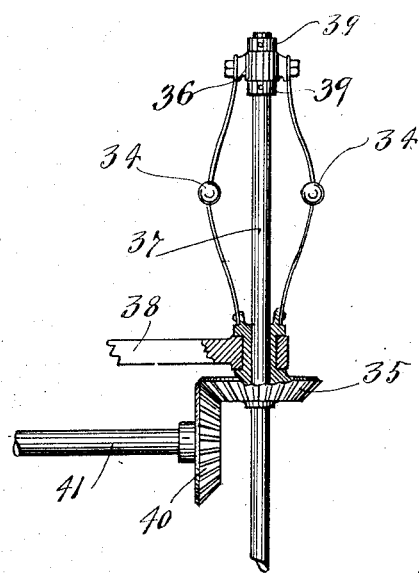

Referring to the drawings, Figure 1 is a diagrammatic view in elevation, showing the improved speed controlling mechanism applied to a turbine water wheel of standard construction. Fig. 2 is a detail view partly in elevation and partly in vertical section showing, on a larger scale than Fig. 1, the so-called anti-racing device in the form of a dash pot and piston connection between a part which is connected for movement with the gate of the water wheel, and certain of the primary contact holders of the electrical relay; and Fig. 3 is a detail view partly in elevation and partly in vertical section, showing on a larger scale than in Fig. 1, the so-called relay actuator, involving centrifugally actuated water wheel driven governor balls or weights.

The turbine water wheel, to which my invention is shown as applied, is of standard construction, and of the parts thereof it is only desirable for the purposes of this case to note the casing 1, having an inlet 2 and an outlet 3; the water wheel 4, which carries a driving shaft 5; and the gate or valve 6 connected by a gear segment 6$^a$ and pinion 7$^a$ to the gate shaft 7, by means of which it is oscillated, in one direction to open the inlet passage, and in the other direction to close said inlet passage. The wheel shaft 5 carries a spur gear 8 and a larger spur gear 9. On the gate shaft 7 is a spur pinion 10. The power of the water wheel may, of course, be transmitted from the main shaft 5, through pulleys and belts or other devices, not shown, but which may be of the usual or any suitable construction.

Power generated by the water wheel is utilized to move the gate 6, and to this end the wheel shaft 5 is connected to the gate shaft 7, through a reversible differential gearing, preferably constructed as follows: The numeral 11 indicates a counter shaft journaled in suitable bearings (not shown) and provided, preferably near one end, with a spur pinion 12. The numeral 13 indicates a vertically movable rack that meshes with the pinions 10 and 12 and is guided for endwise sliding movements by suitable keepers 14. Loosely mounted on the shaft 11 is a large spur gear 15 that meshes with the large gear 9 on the wheel shaft 5. Also journaled on the shaft 11 is a spur gear 16 that alines with the gear 8 on the wheel shaft 5. The numeral 17 indicates an intermediate spur pinion that meshes with said two gears 8 and 16 and is journaled in suitable bearings (not shown). The gear 15 carries a bevel gear 18 and the gear 16 carries a bevel gear 19. The countershaft 11, adjacent to the bevel gear 18, is provided with one or more radially projecting studs 20 upon which are journaled bevel pinions 21 that mesh with said bevel gear 18. The numeral 22 indicates a bevel gear that is loosely journaled on the counter shaft 11 and meshes with the pinions 21 and is provided with or secured to a projecting friction disk or flange 23.

Adjacent to the bevel gear 19 the counter shaft 11 is provided with one or more radially projecting studs 24 on which are mounted spur pinions 25 that mesh with said gear 19. Journaled on said counter shaft and meshing with said pinion 25, is a bevel gear 26 that is secured to or provided with a projecting friction disk or flange 27.

The two friction disks 23 and 27 are but slightly spaced apart, and working between the same is a non-rotary friction brake or plate 28. This friction brake, as shown, is mounted for lateral movement into engagement with either of the two friction disks, and it is supported and given such movements, by a brake lever 29, pivoted at its lower end and free to vibrate at its upper end. Said brake lever 29 is normally held in its central or intermediate position, with the friction brake 28 out of engagement with both of said friction disks, by means of a centering device preferably in the form of a pair of pivoted arms 30 that are normally spring pressed against an intermediate stop 31, and the depending ends of which embrace the free upper end of said brake lever 29.

On each side of the free end of the brake lever 29 is one of a pair of the so-called "secondary magnets" 32 of the electrical relay, above referred to and hereinafter described in detail. The upper end of the brake lever 29 or a part thereof, acts as an armature, and is adapted to be drawn in one direction or the other, from its normal position, by whichever of the two secondary magnets 32 is energized.

*Operation of differential gate actuating gear.*—We will assume that the water wheel 4 and shaft 5 are running in the direction of the arrow marked thereon in Fig. 1, and that the gate 6 is closed by rotary movement of the shaft 7, in the direction of the arrow marked on said shaft 7, and is opened, of course, by a reverse movement of said shaft 7. When the brake 28 is in its intermediate or idle position shown in Fig. 1, the two friction disks 23 and 27, being then free from said brake, are freely rotated in reverse directions and the counter shaft 11 will then remain stationary, because the parts which move on said counter shaft moves in different directions. When the right hand magnet 32 is energized, the brake 28 is thrown against the right hand friction disk 27 so that the movements of the latter is stopped or retarded, thereby causing the counter shaft 11 to be rotated in the direction of the arrow marked thereon, and thereby lowering the rack 13 and rotating the gate 6 in the direction of the arrow marked on its shaft 7, to or toward its closed position. When the left hand magnet 32 is energized, the brake lever 29 is drawn toward the left, thereby throwing the brake 28 into frictional contact with the friction disk 23 and thereby stopping or retarding the rotation of the bevel gear 22. When the motion of the bevel gear 22 is stopped or retarded, the counter shaft 11 will be rotated in the direction reverse to that indicated by the arrow marked thereon, the rack 13 will be raised and the gate 6 will be moved to or toward its wide open position.

The numeral 33 indicates a direct current generator of standard or any suitable construction. The engagement of the primary contacts of the electrical relay is regulated by a small centrifugal relay actuator which, in one way or another, is driven from and whose speed is dependent upon that of the water wheel 4. Of the parts of this centrifugal relay actuator, 34$^a$ indicates a pair of resilient links that carry very small balls 34 and connect the hub of a gear 35 to a collar 36, through which gear and collar a vertical shaft 37 is passed. The gear 35 is journaled in a fixed bearing 38 and is held against endwise movement. The shaft 37 is free to rotate and slide through the gear 35, but is provided with fixed collars 39 that cause it to move vertically with the sleeve 36, under the action of centrifugal force of the balls 34. The gear 35 meshes with a gear 40 of a shaft 41, which shaft is journaled in suitable bearings (not shown) and is provided with a pulley 42. A belt 43 runs over the pulley 42 and over a pulley 44 on the water wheel shaft 5, and thereby transmits motion from the water wheel to the ball carrying shaft 37. The lower end of the vertically movable non-rotary shaft 37 is pivotally connected to the intermediate portion of a pivoted contact holder or lever 45.

46—47 indicates a dash pot and piston, the stem of the latter being connected to the contact lever 45 and serving to prevent the balls 34 and the said contact lever 45 from fluttering. The contact lever 45 has an insulated free end 45$^a$ that is electrically connected to a wire $a$ which, as shown, is connected to the positive side of the generator 33, by a wire $m$. This lever end 45$^a$ constitutes one of the three primary contacts of the electrical relay.

48 and 49 indicate contact carrying levers or holders that are pivoted at 50. These contact holders are yieldingly connected, by a light coiled spring 51, that normally holds both thereof against an interposed fixed stop 52. As shown, the lower contact holder 49 is counter balanced by a weight 53. The purpose of the spring 51 is to yieldingly hold said contact holders 48 and 49 against the said stop 52; but this same result might be accomplished solely by the action of gravity.

Of the parts of the anti-racing device, the numeral 54 indicates a dash pot that is rigidly connected, as shown, by a stem 55 to the upper end of the rack 13. Working loosely within the dash pot 54 is a piston 56, the rod 57 of which is provided, at its upper end, with lugs or lateral projections 58 that engage one with the under surface of the upper contact holder 48, and the other with the upper surface of the lower contact holder 49. The weight 53 should be heavy enough to counter balance, not only the contact holder 49, but also the piston 56 and its stem. With this arrangement, if the piston rod 57 moves upward, the contact holder 48 will be raised, and if said piston rod moves downward, contact holder 49 will be lowered.

59 indicates a tubular pipe valve that is rigidly supported at its upper end by suitable fixed brackets 60. This pipe valve depends into the dash pot 54 and works through a perforation in the piston 56, as best shown in Fig. 2. At its intermediate portion, the pipe valve 59 is provided with a partition or plug 61, and above and below said partition it is provided with vertical slots 62. The partition 61 is so located that when the piston 56 stands in its intermediate position, shown in Fig. 2, no oil or other liquid contained in the dash pot 54 can go through said pipe valve; but if the piston moves up or down, the oil can go through the slots 62 and through the piston, thereby allowing the piston to move more freely, as will hereinafter more fully appear. Preferably, the pipe valve 59 is open at both ends. There should, of course, always be some leakage between the piston 56 and the dash pot 54 and between said piston and the exterior of said pipe valve, so that the said piston can not become locked or blocked in its intermediate position, by liquid caged in the dash pot. Also, there should be leakage between the upper head of the dash pot 54 and said rod 57 and pipe 59.

Describing now the electrical relay, $b$ and $c$ indicate magnetic windings of the so-called "primary magnets" of said electrical relay. Both of these windings are connected in multiple to the generator 33, by wires $d, f, k$ and $m$. The said wires $k$ and $m$, as shown, are connected, respectively, to the negative and positive poles, or terminals of said generator. The said coils $b$ and $c$ surround the upper portions of cores $n$ and $o$, respectively, and on the lower portions of said cores are coils $p$ and $q$. These coils $p$ and $q$ are wound in reverse directions to the coils $b$ and $c$, respectively, and the upper terminals thereof are connected by a wire $r$ to the said wire $k$. When the coils $p$ and $q$ are magnetized, they demagnetize or neutralize the coils $b$ and $c$, depending on which of said coils $p$ and $q$ is magnetized. The lower terminal $y$ of the coil $p$ is connected, by a wire $s$, to a contact $t$ that is carried by the free end of the contact holder 48, but is suitably insulated therefrom. The lower terminal of the coil $q$ is connected, by a wire $u$, to a contact $v$ that is carried by the free end of the contact holder 49 but is suitably insulated therefrom. These contacts $t$ or $v$ constitute the other two members of the group of the electrical relay. With this arrangement, the upward movement of the lever or contact holder 45 will bring the intermediate primary contact $45^a$ into engagement with the upper primary contact $t$, and downward movement of said lever or holder will bring said contact $45^a$ into engagement with the lower primary contact $v$.

As shown, the inner terminals of the coil of the brake-actuating secondary magnet 32 are connected, by a wire $w$, to the wire $k$ and, hence, to the negative terminal of the generator 33. The outer terminals of the coil of the right and left hand brake actuating secondary magnet 32 are connected by wires $h$ and $j$, respectively, to fixed contacts H and J. The said contacts H and J are located in close proximity to the upper ends of the cores $o$ and $n$, respectively. Located close to but just above the fixed contacts H and J, respectively, are similar fixed contacts A and B. These two contacts A B are connected by a wire D to the wire $m$, before noted, which wire $m$, it will be seen, constitutes an extension of the wire $a$.

E and F are armature levers pivoted at their inner ends with the free ends subject, respectively, to the magnet cores $o$ and $n$, and adapted to be moved upward by springs G to close the circuit, respectively, between the contacts A—H and B—J. The parts $45^a$—$t$—$v$, as already noted, constitute a group of primary contacts, and it should be here stated that the parts A H B J F E constitute a group of secondary contacts of the electrical relay.

M and N are condensers. Condenser N connects across contacts A—H through wires $x$, $z$ and portion of wire D. Condenser M connects across contacts B—J through wires $y$ and $z$ and portions of wires D—$j$. The condensers N and M take up the arc across the said contacts A—H and B—J and cause the magnets 32 to release armature and lever 29 more quickly, thereby stopping the gate from over-travel due to arcing at contacts A—H B—J. In practice I have found that the condensers serve to keep the said secondary contact clean, so that they will always make good contact and will not wear out so fast, as when said condensers are not employed.

*Summary of operation.*—When the water wheel is running at the predetermined desired speed, the contact holder or lever 45 will be held in its intermediate position, the three primary contacts $45^a$, $t$ and $v$ will be held out of engagement as shown in Fig. 1, and the brake 28 will be held in its intermediate or idle position, out of contact with the rotating friction disks 23 and 27. If the speed of the water wheel increases above the predetermined desired speed, the centrifugally actuated balls 34 will move outward and cause the shaft 37 and contact holder 45 to move downward, thereby moving the intermediate primary contact $45^a$ into engagement with the lower primary contact $v$, and thus allowing the electricity to flow through the coil or winding $q$. This neutralizes coil $c$ and demagnetizes core $o$ and allows right hand spring G to raise armature lever E. When said armature E is thus raised by said spring, it closes the circuit between contacts A—H and thus causes the electricity, from the generator 33, to flow through the right hand brake-actuating magnet coil 32, by way of wires $k$, $w$, $h$, D and $m$. As already described, when the right hand brake actuating secondary magnet 32 is energized, the brake 28 is drawn toward the right and, through the differential gate actuating gear, the gate 6 is moved toward its closed position. The water passing to the wheel possesses such inertia that it can not respond quickly to changes in the position of the gate and could not change the speed of the wheel, or rather, bring the speed of the wheel to the predetermined desired speed, before the gate would have passed the correct position for the new "load" and, hence, would produce "racing" of the wheel. This, however, is prevented by the action of the dash pot 54 and piston 56 (of the anti-racing device), the former of which is connected to and moves downward with the rack 13, when said rack is moved downward, in the act of closing the gate. This downward movement of the dash pot 54 carries the piston 56 and its rod 57 downward and causes the lower lug 58 to move the contact holder 49 downward and, thereby separate the contact $v$ from the intermediate primary contact $45^a$, before the gate 6 has been moved too far. When the circuit is thus broken between the said contact members $v$ and 45, the coil $q$ is deënergized, the coil $c$ draws the armature E downward, breaking the circuit between the contacts A—H, with the result that the right hand secondary magnet 32 is deënergized, the brake 28 is thrown into its inoperative intermediate position by its centering device 30—31, and further downward movement of the rack 13 and closing movement of the gate is stopped for the time being. This also stops the further downward movement of the dash pot 54 and piston 56. The dash pot 54 being fixed to the rack 13 is moved upward therewith, carrying the piston 56 and its stem upward, and causing the upper lug 58 to raise the upper contact holder 48 and move the contact $t$ out of engagement with the contact lever 45, thereby breaking the circuit at that point, before the gate is moved too far, in the direction of its wide open position. This timely stopping of the upward movement of the rack 13, also, of course, stops further upward movement of the dash pot 54, piston 56 and contact holder 48, so that the spring 51 (preferably assisted by gravity of the parts) then starts moving the upper contact holder 48 and contact $t$ downward to their normal position, to-wit, to a position in which said contact holder engages the stop 52. The pipe valve, so-called, operates the same both under upward and downward movements of the dash pot, or in other words, both under closing and opening movements of the gate 6, except that under the latter the oil finds its free passage through the upper slots 62 of the said pipe valve 59.

When the speed of the water wheel falls below the predetermined desired speed, the centrifugally actuated balls 34 move inward, thereby raising the contact lever 45 and moving the same into engagement with the contact $t$, thereby closing the circuit at that point and causing electricity to flow through the coil or windings $p$. When the coil $p$ is magnetized, it neutralizes the coil $b$ and demagnetizes the core $n$, thus allowing the armature F, under the action of the left hand spring G, to move upward and close the circuit between the contacts B—J. When the circuit is closed between the contacts B—J, electricity from the generator 33 flows through the coil of the left hand brake controlling magnet 32, by way of wires $k, w, j$, D and $m$. Also, as already described, when the left hand brake-actuating secondary magnet 32 is energized, the brake 28 is moved toward the left, thereby, through the differential gate actuating gear, causing the rack 13 to move upward and the gate 6 to be moved toward its wide open position. Just as soon as the dash pot stops, the action of the spring 51, (assisted preferably by gravity of the parts) starts moving the upper contact holder 48 downward and continues such movement until it strikes the stop 52. This downward movement of the contact holder 48, of course, carries the piston 56 downward with it. If the contact $t$ should be carried too far away or upward from its normal position, the piston 56 would pass above the partition 61 of the pipe valve 59, and the oil or other liquid within the dash pot 54 may then flow freely through the upper slots 62, and thus allow the piston to return more freely and quickly to its normal position, to-wit, to a position in which the contact holder 49 bears against the stop 52. It will thus be seen that the anti-racing device made up of the dash pot 54 and piston 56 is self adjusting to different positions of the rack 13 and, consequently to different positions of the gate 6. Otherwise stated, after each gate adjusting action, the piston 56 is returned to its centered or normal position with respect to the so-called pipe valve 59 and its partition 61, while the dash pot may assume various different positions in respect to said piston. Stated in another way, if the working load of the water wheel be very light, so that the gate 6 is opened but slightly, the dash pot 54 will be in a lowered position, while if the working load on the water wheel is very heavy, so that the gate 6 is wide open or nearly so, said dash pot will be in a raised position with respect to the position shown in the drawings, but the piston 56 will stand in its centered position with respect to the pipe valve 59, in both instances, as long as the predetermined desired speed of the water wheel is maintained.

In the drawings, for the purpose of simplifying the construction and description, the so-called primary magnets $n$—$b$—$p$ and $o$—$c$—$g$ and the secondary magnets 32 are shown as provided with straight cores, but in practice it will be understood that horse shoe magnets, or magnets having U-shaped cores would be used, on account of the much greater efficiency of the latter type of magnets. Also, in practice the coils $d$—$p$ would preferably be wound one over the other, but, of course, in reverse directions, and the same statement is true with respect to the coils $c$—$g$.

The term "electrical relay" is herein used in a broad and liberal sense to designate the electrical or magnetically actuated part of the mechanism for adjusting the speed controlling element of the motor.

The expression "gearing" or "power driven gearing" as herein used to designate the mechanism by which the power controlling element of the motor is adjusted, is used in a broad sense and is not limited to bevel gears, spur gears, or any other kind of toothed gears or friction gears.

The mechanism described has been put into actual use in connection with a water wheel and has been found highly efficient for the purposes had in view.

What I claim is:

1. The combination with a motor, an electrical relay and connections for adjusting the speed controlling element of said motor, a relay actuator subject to changes in speed of said motor, and an anti-racing device comprising an extensible connection between certain of the said contacts of said relay and a part connected for movement with the speed controlling element of said motor, substantially as described.

2. The combination with a motor, of an electrical relay comprising primary and secondary contacts, primary and secondary magnets, and connections for adjusting the speed controlling element of said motor, a relay actuator subject to changes in speed of said motor and comprising a circuit controlling contact coöperating with said primary contacts, and an anti-racing device comprising an extensible connection between said primary contacts and a part connected for movement with the speed controlling element of said motor, substantially as described.

3. The combination with a motor, an electrical relay and connections for adjusting the speed controlling element of said motor, a relay actuator subject to changes in speed of said motor, and an anti-racing device comprising a dash pot and piston constituting an extensible connection between certain of the contacts of said relay and a part connected for movement with the speed controlling element of said motor, substantially as described.

4. The combination with a motor, an electrical relay and connections for adjusting the speed controlling element of said motor, a relay actuator subject to changes in speed of said motor, and an anti-racing device comprising a dash pot and piston constituting an extensible connection between certain of the contacts of said relay and a part connected for movement with the speed controlling element of said motor, and yielding means tending to restore said piston to normal position irrespective of the position of said dash pot.

5. The combination with a motor, of an electrical relay comprising primary and secondary contacts, primary and secondary magnets and connections for adjusting the speed controlling element of the motor, a relay actuator subject to changes in speed of said motor and having a circuit controlling contact coöperating with said primary contacts, an anti-racing device comprising a dash pot and piston constituting an extensible connection between said primary contacts and a part connected for movement with the speed controlling element of said motor, and yielding means tending to restore said piston and primary contacts to normal positions irrespective of the position of said dash pot.

6. The combination with a motor and a gearing for rendering the power of the motor available to adjust the speed controlling element of said motor, of an electrical relay with connections for controlling said gearing, a relay actuator subject to changes in speed of said motor, and an anti-racing device operative, under initial movements of said gearing, to interrupt the gear controlling action of said relay, which relay actuator is self-adjustable to different positions of the said speed controlling element of said motor, substantially as described.

7. The combination with a motor and a reversible gearing for rendering the power of the motor available to adjust the speed controlling element of said motor, of a reversely acting electrical relay with connections for controlling said reversible gearing, a relay actuator subject to changes in speed of said motor, and an anti-racing device operative, under initial movements of said gearing, to interrupt the gear controlling action of said relay, and which relay actuator is self adjustable to different positions of the said speed controlling element of said motor, substantially as described.

8. The combination with a water wheel and a reversible gearing for rendering available the power of said wheel to adjust the speed controlling element of said wheel, of a reversely acting friction brake for rendering said gearing operative, in either of two directions, a reversible relay actuator including a centrifugal governor subject to changes in speed of said water wheel, an electrical relay comprising primary contacts subject to the control of said relay actuator, primary magnets controlled by said primary contacts, secondary contacts controlled by said primary magnets, and secondary magnets controlled by said secondary contacts and operative on said brake to reverse the action of said gearing, substantially as described.

9. The combination with a motor and a reversible gearing for rendering available the power of the motor to adjust the speed controlling element of said motor; of a reversely acting electrical relay with connections for controlling the action of said reversible gearing, which relay comprises yieldingly held outer primary contacts, an intermediate primary contact, primary magnets controlled by said primary contacts, secondary contacts controlled by said primary magnets, and a pair of reversely acting secondary magnets controlled by said secondary contacts and operative to reverse the action of said reversible gearing; a relay actuator subject to changes in speed of said motor and operative on said intermediate primary contact of said relay; and an anti-racing device comprising a dash pot and piston and a coöperating piston centering valve, said dash pot and piston constituting an extensible connection between the outer primary contacts of said relay and a movable part of said reversible gearing, substantially as described.

10. The combination with a motor, and an electrical relay and connections for adjusting the speed controlling element of said motor, a relay actuator subject to changing speeds of said motor, and an anti-racing device comprising a dash pot and piston constituting an extensible connection between certain of the contracts of said relay and a part connected for movement with the speed controlling element of said motor, and a centering valve extending into said dash pot and through said piston, provided with an intermediate plug or partition and with passages above and below said partition, substantially as described.

11. The combination with a motor, of an electrical relay comprising primary and secondary contacts and primary and secondary magnets, and connections for adjusting the speed controlling element of said motor, a relay actuator subject to changes in speed of said motor, and a condenser connected across the secondary contacts of said relay, substantially as described.

12. The combination with a water motor, including a wheel and a gate, of a reversible gearing for rendering the power of said wheel available to adjust said gate, an electrical relay with connections for reversing the action of said gearing, a relay actuator subject to changes in speed of said water wheel, and an anti-racing device, comprising a dash pot and piston constituting an extensible connection between certain of the contacts of said relay and a part of said reversible gearing through which motion is imparted to said gate, substantially as described.

13. The combination with a water motor, including a wheel and a gate, of a reversible gearing for rendering available the power of said wheel within said gate, an electrical relay with connections for reversing the action of said gearing, a relay actuator subject to changes in speed of said water wheel, an anti-racing device, comprising a dash pot and piston constituting an extensible connection between certain of the contacts of said relay and a part of said gearing through which motion is imparted to said gate, and yielding means tending to restore said piston to its normal position irrespective of the position of said dash pot, substantially as described.

In testimony whereof I affix my signature in presence of two witnesses.

JOHN PEARSON.

Witnesses:
MALIE HOEL,
F. D. MERCHANT.